Figure 1:
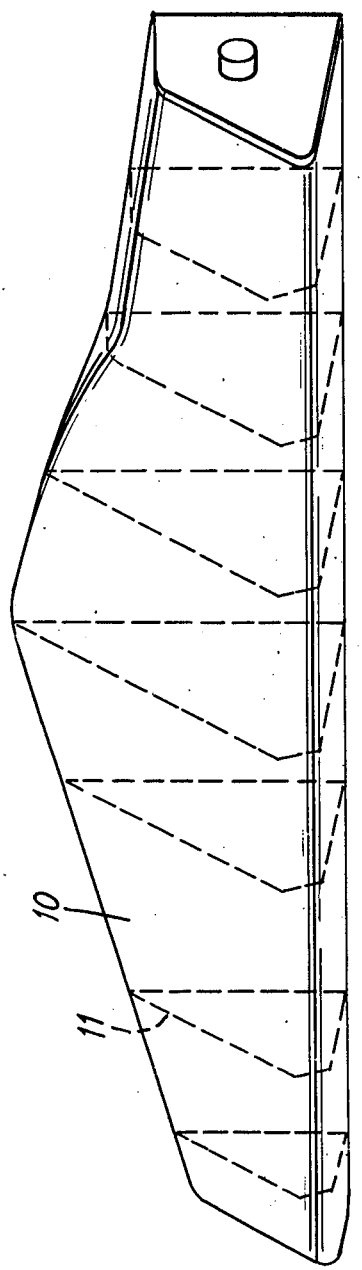

United States Patent [19]

Broadhurst

[11] 4,029,272
[45] June 14, 1977

[54] VARIABLE-GEOMETRY AIRCRAFT SEAL
[75] Inventor: Jeffrey Charles Broadhurst, Burton-on-Trent, England
[73] Assignee: Woodville Rubber Company Limited, England
[22] Filed: Mar. 8, 1976
[21] Appl. No.: 665,157
[30] Foreign Application Priority Data
Mar. 10, 1975 United Kingdom .............. 9875/75
July 22, 1975 United Kingdom ............ 30687/75
[52] U.S. Cl. ................................. 244/46; 139/389
[51] Int. Cl.² ........................ B64C 1/34; B64C 3/40
[58] Field of Search ........................ 244/46, 43, 130; 139/384 R, 387 R, 389, 390; 5/365, 368

[56] References Cited
UNITED STATES PATENTS

| | | | |
|---|---|---|---|
| 3,294,605 | 12/1966 | Fischer ...................... | 139/384 R X |
| 3,480,237 | 11/1969 | Appleby ............................ | 244/46 |
| 3,829,353 | 8/1974 | Fisher ........................... | 139/384 R |

Primary Examiner—Trygve M. Blix
Assistant Examiner—Barry L. Kelmachter
Attorney, Agent, or Firm—Woodcock, Washburn, Kurtz & Mackiewicz

[57] ABSTRACT

For sealing the gap between the fuselage and a swing-wing of a swing-wing aircraft there is provided an elongated, inflated, flexible bag mounted in a recess of the fuselage, all the longitudinal walls of the bag being of flexible material and including a flexible base-wall affixed by a frame along its two longitudinal edges to the aircraft structure, the bag further having a multiplicity of internal, substantially parallel, closely-spaced, flexible, transverse, flanged diaphragms attached by the flanges along their sides to corresponding longitudinal walls of the bag, the flexible diaphragms, at the inflation pressure employed, being rendered substantially inextensible by reinforcing webs in directions such that the transverse cross-sectional dimensions and shape of the inflated bag are constrained by the diaphragms to conform to the dimensions and shape of the diaphragms, and the diaphragms being apertured to permit inflation of the bag from one end.

10 Claims, 24 Drawing Figures

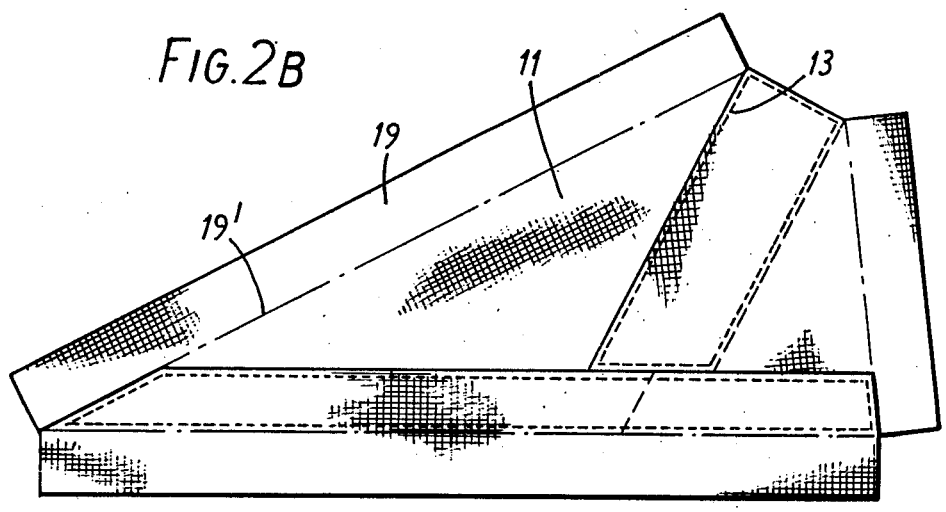
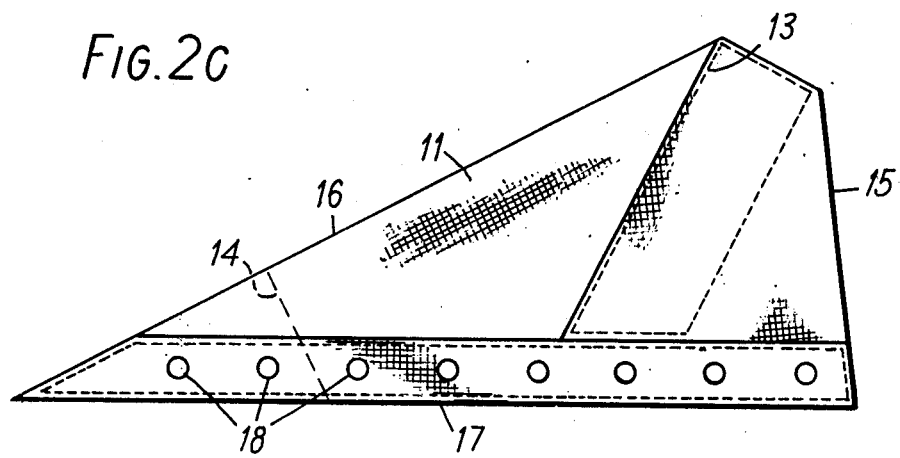

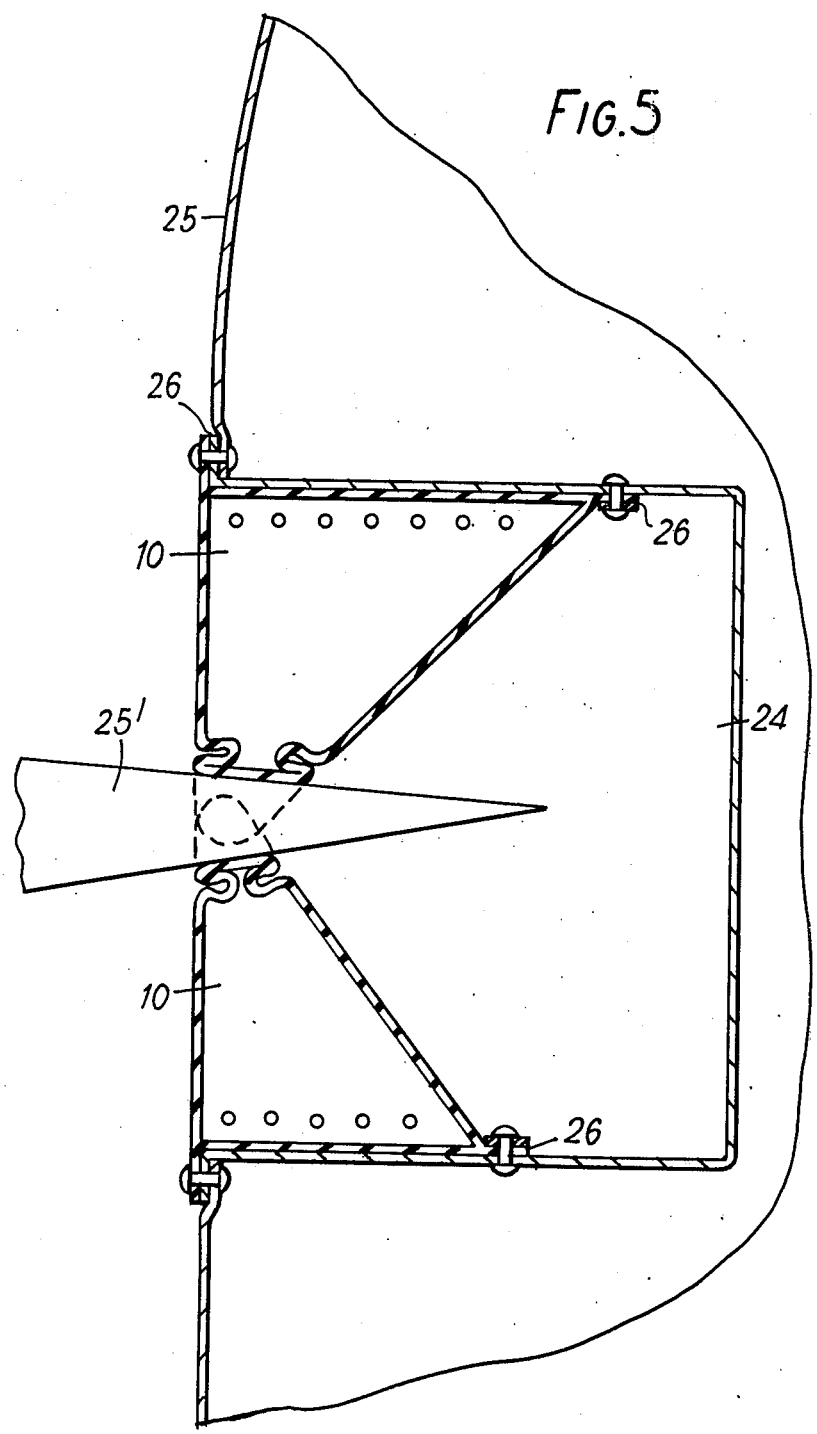

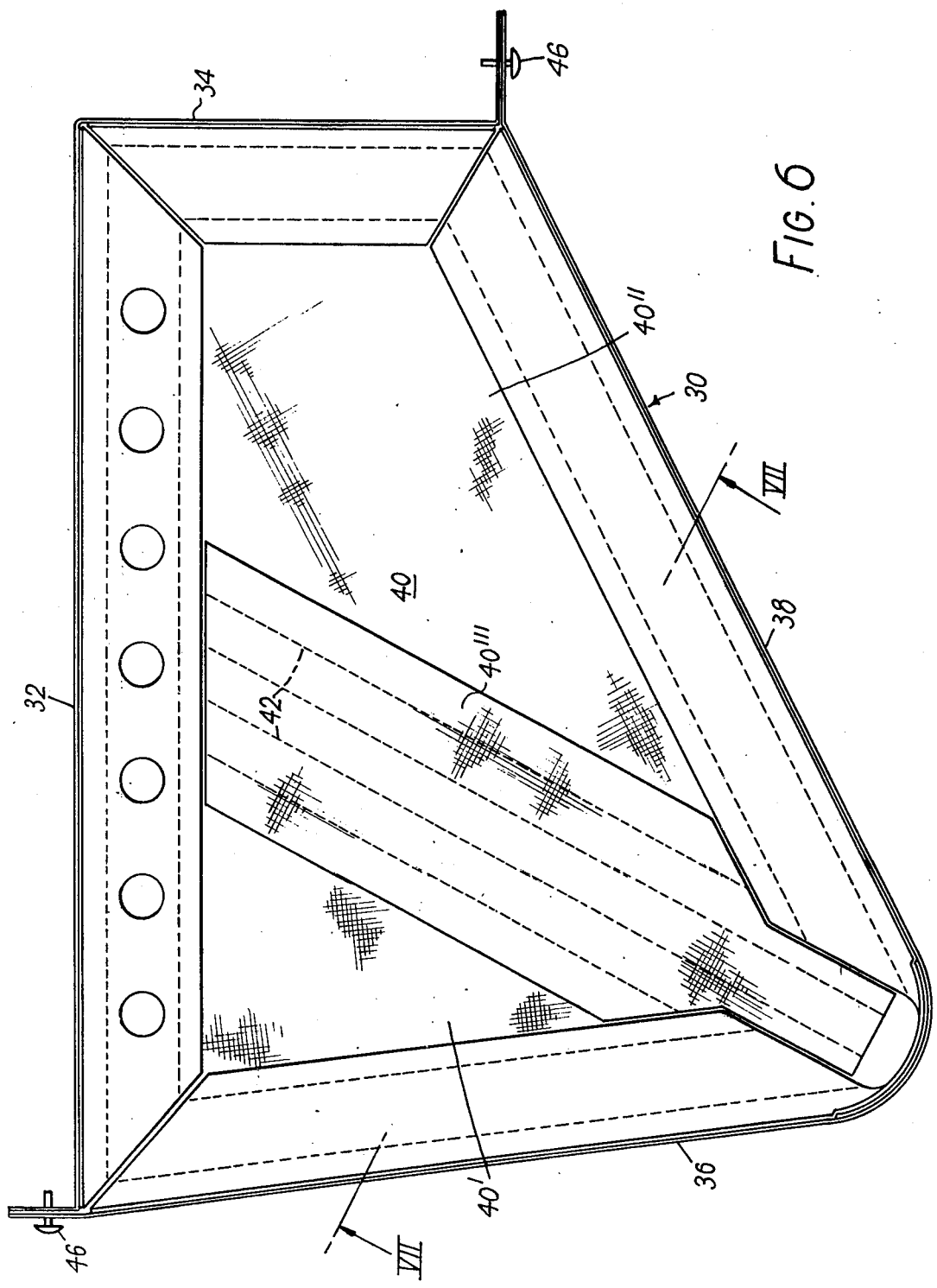

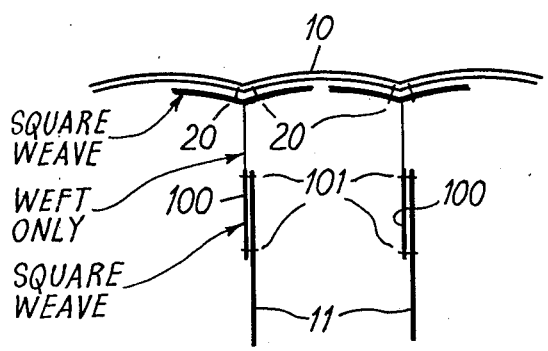
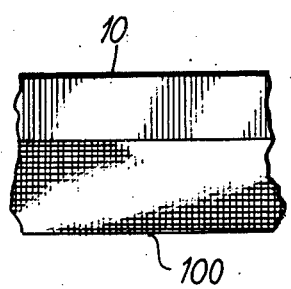
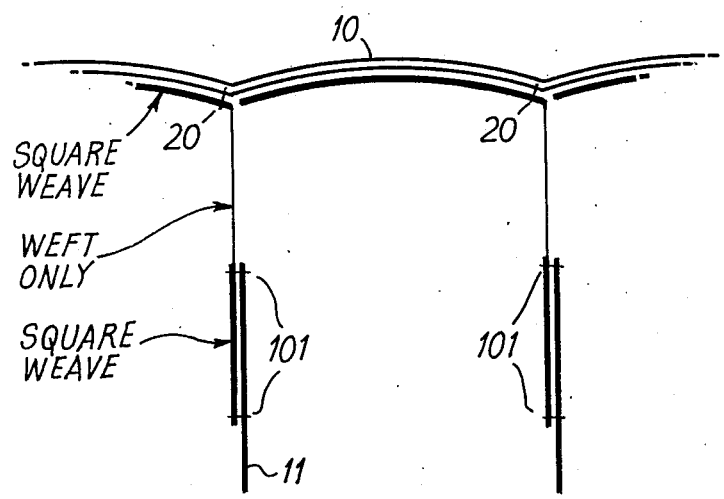

VARIABLE-GEOMETRY AIRCRAFT SEAL

The present invention relates to variable-geometry aircraft, sometimes referred to as "swing-wing aircraft", and is concerned with apparatus employed to provide a seal between the fuselage of such an aircraft and an aerofoil which can be swung fore and aft with its trailing edge accommodated more or less in a recess or gap in the fuselage depending upon the angle through which the aerofoil is swung.

According to the present invention in one aspect, a variable-geometry aircraft is provided with a seal between a surface of an aerofoil and the fuselage, the seal comprising an elongated, inflated, flexible bag bridging a gap between the aerofoil and the fuselage, the bag being mounted in a recess in the fuselage with one wall of the bag serving as a continuation of the fuselage-surface across the gap to the aerofoil, all the longitudinal walls of the bag being of flexible material and including a flexible base-wall affixed along its two longitudinal edges to the aircraft structure, the bag further having a multiplicity of internal, substantially parallel, closely-spaced, flexible, transverse, flanged diaphragms attached by the flanges along their sides to corresponding longitudinal walls of the bag, each flexible diaphragm being constructed of a plurality of major parts of elastomeric sheet material affixed to one another, each major part being individually reinforced by a reinforcing web so arranged as to render the diaphragm substantially inextensible from a central region in the directions of the respective major walls, and each diaphragm being apertured to permit the passage of inflating gas therethrough.

According to the present invention therefore in another aspect, there is provided an inflatable, flexible bag suitable for use in providing a seal between an aerofoil and the fuselage of a variable-geometry aircraft, the bag having an elongated form and having a base-wall and at least two other major walls and a cross-section which may vary along the length of the bag, the cross-sectional shape and dimensions of the bag, when inflated, being determined solely by the shape and dimensions of a multiplicity of internal, substantially parallel, closely-spaced, flexible, transverse, flanged diaphragms attached by the flanges along their sides to corresponding wall respectively of the bag, each diaphragm having at least three major edges attached to corresponding major walls of the bag, each diaphragm being constructed of a plurality of major parts of elastomeric sheet material affixed to one another, each major part being individually reinforced by a reinforcing web so arranged as to render the diaphragm substantially inextensible from a central region in the direction of the respective major walls, and each diaphragm being apertured to permit the passage of inflating gas therethrough. Thus the cross-sectional shape and dimensions of the bag are determined solely by the diaphragms which are substantially inextensible in the directions towards the major walls at the inflation pressure concerned whereby ballooning is avoided and simple, peripheral, clamping suffices. Fabrication of the bag is simplified by progressive location and fixing of the diaphragms around their entire periphery. The apertures in the diaphragms permit inflation from one end of the bag. Usually the diaphragms will be of triangular or wedge shape in which case there are only three sides all of which are the major sides of the diaphragms. Sometimes it may be necessary to depart somewhat from triangular shape by modifying the shape of, say, one corner in which case there are three major sides and one minor side. The diaphragms may be fabricated from elastomeric material such as neoprene sheets rendered inextensible in the required directions by the warp of a woven reinforcing web such as a woven nylon web.

Figure 2A:
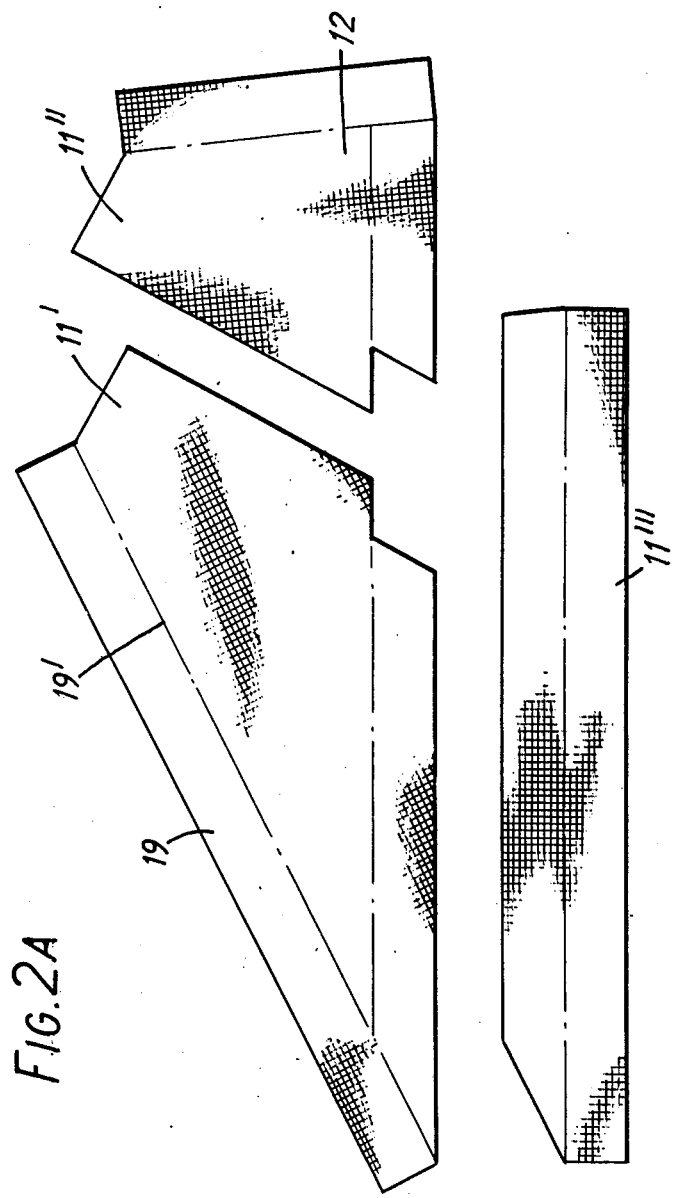

The invention will now be described by way of example with reference to the accompanying schematic drawings, in which:

FIG. 1 shows a bag according to the invention with some of a multiplicity of internal diaphragms indicated in dotted lines, FIG. 2A shows three piece parts of a diaphragm of the arrangement of FIG. 1, FIG. 2B shows the parts of FIG. 2A assembled to form a diaphragm, FIG. 2C shows the diaphragm of FIG. 2B with folded flanges.

Figure 3:
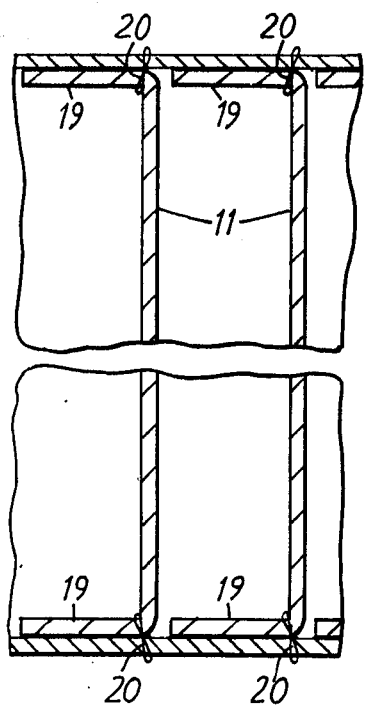
Figure 7:
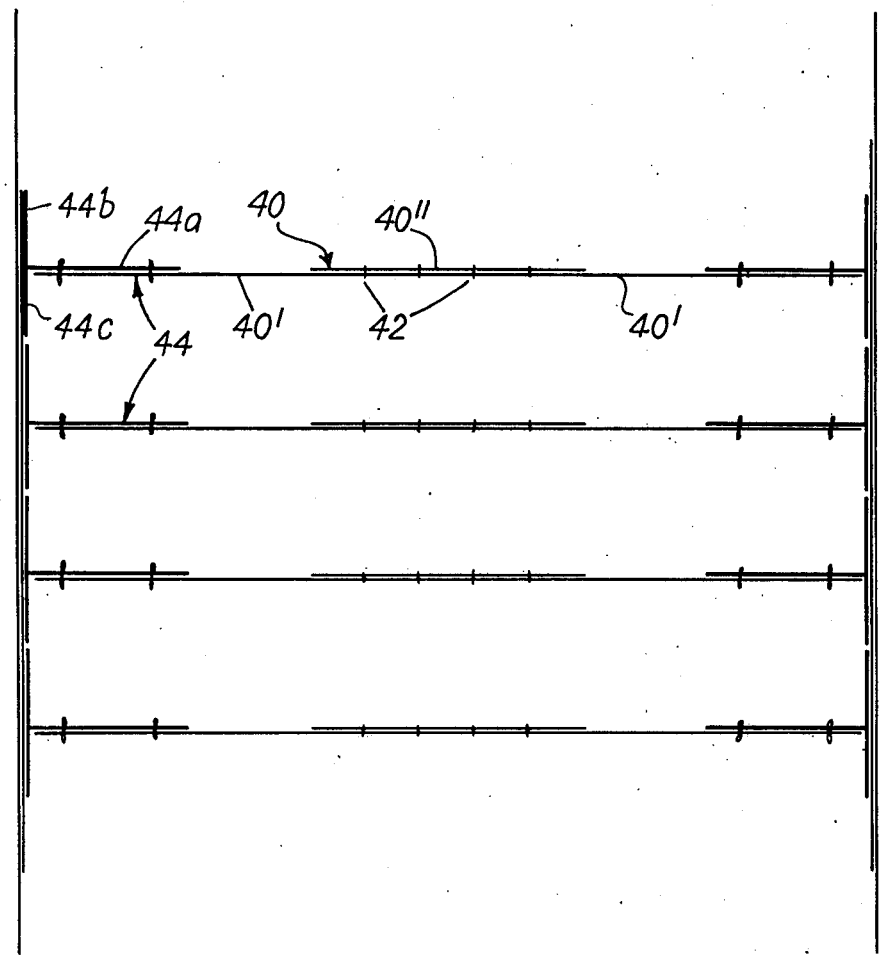
Figure 8:
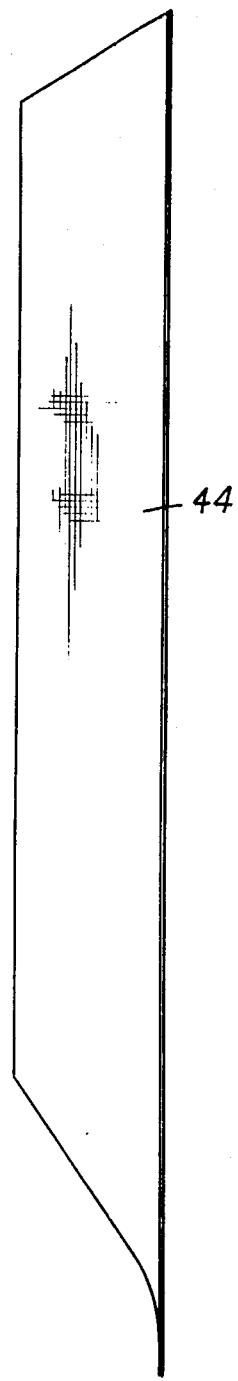
Figure 11A:
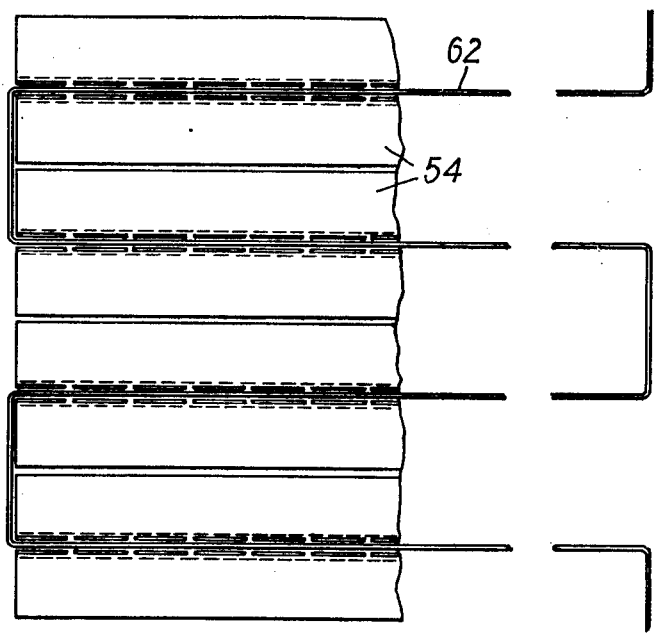
Figure 11B:
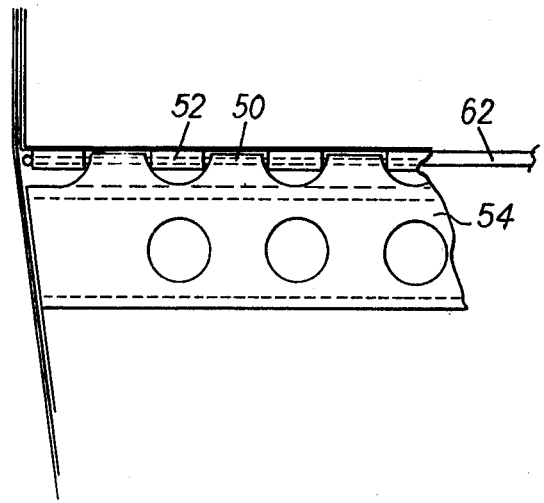
Figure 9A:
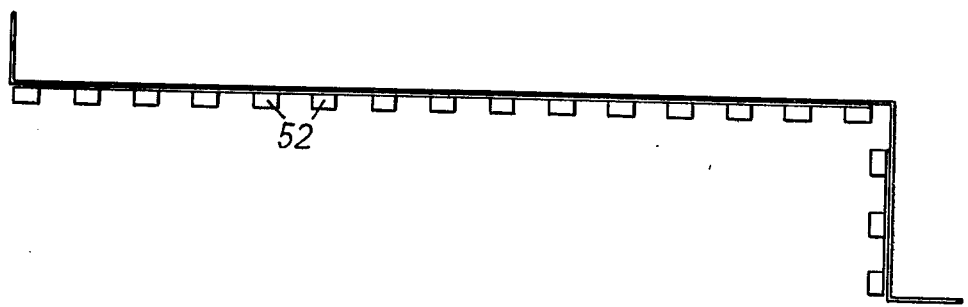
Figure 9B:
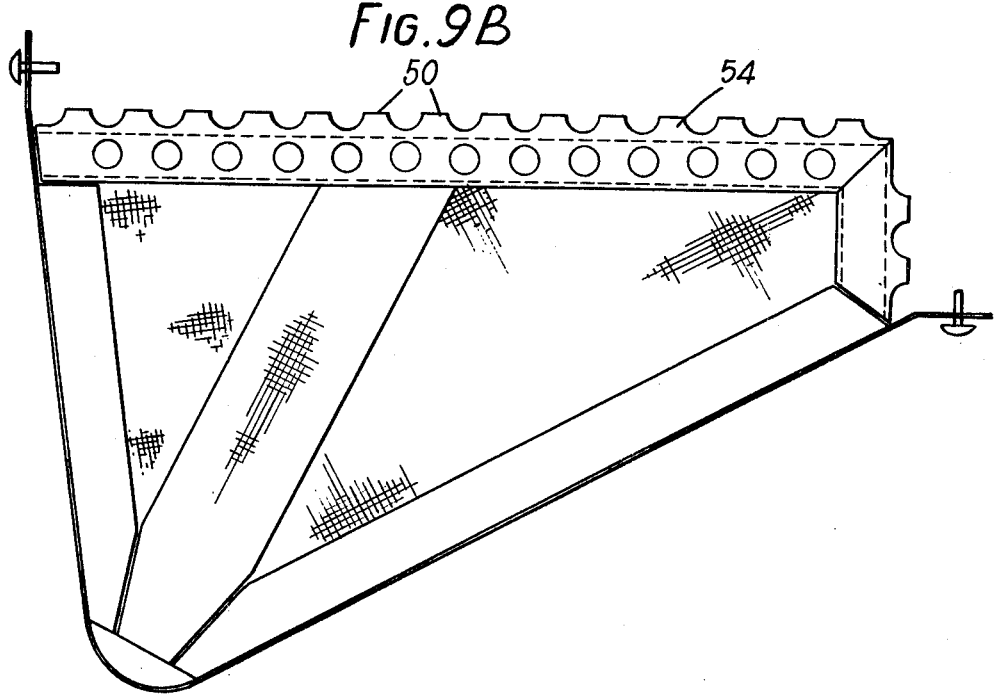
Figure 10A:
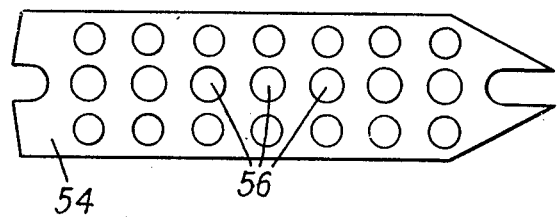
Figure 10B:
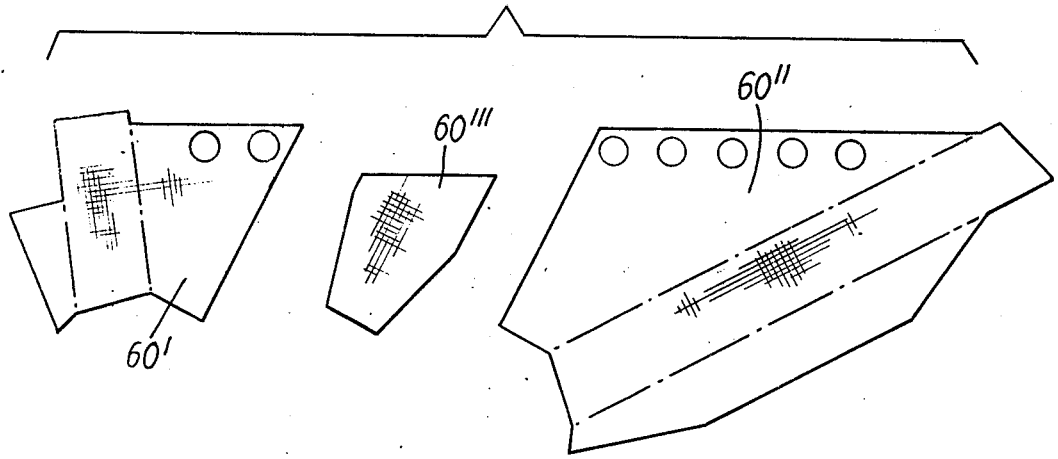
Figure 14A:
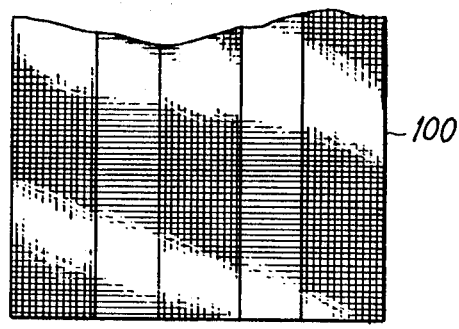
Figure 14B:
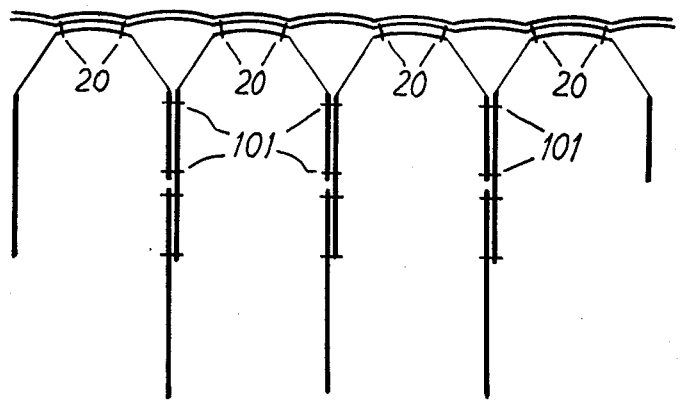
Figure 14C:
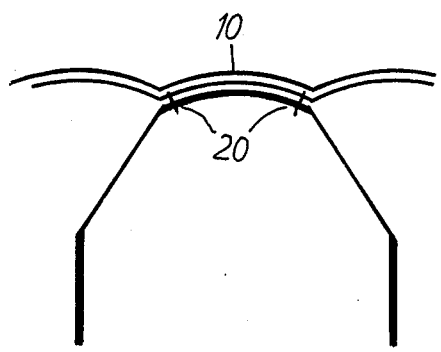

FIG. 3 shows part of the bag of FIG. 1 to indicate the manner in which the diaphragms are attached to the walls of the bag, FIGS. 4A, 4B, 4C and 4D are a sequence of diagrams indicating the manner in which the bag of FIG. 1 can be fabricated, FIG. 5 shows a fragment of a variable-geometry aircraft according to the invention, FIGS. 6 to 8 show a modification of the arrangement of FIGS. 1 to 5, FIG. 6 being a cross-section of the modified sealing bag, FIG. 7 being a section of part of the bag of FIG. 6 taken along the line VII—VII of FIG. 6, and FIG. 8 showing a ribbon for use in the bag of FIGS. 6 and 7, FIGS. 9 to 11 show another modification of the arrangement of FIGS. 1 to 5, FIG. 9A being a cross-section of the base wall of the modified bag, FIG. 9B being a cross-section of the modified bag but without the base wall of FIG. 9A, FIG. 10A showing the manner in which a part of a diaphragm of FIG. 9B is fabricated, FIG. 10B showing the three pieces of a three-part diagram of FIG. 9B ready for assembly, FIG. 11A showing in plan view the manner in which the parts of FIGS. 9A and 9B are joined by a hinge pin and FIG. 11B showing in side view the manner in which the parts of FIGS. 9A and 9B are joined by the hinge pin, and FIGS. 12 to 14 show preferred forms of the invention. FIG. 12(a) showing a fragment of a sealing bag using T-shaped ribbons joining diaphragms to the walls of the bag, FIG. 12(b) showing a fragment of a T-shaped ribbon for use in the embodiment of FIG. 12(a), FIG. 13 showing a fragment of a sealing bag using L-shaped ribbons joining diaphragms to the walls of the bag, FIG. 14(a) showing part of a ribbon whereby U-shaped joints can be made between diaphragms and the walls of the bag, FIG. 14(b) showing a fragment of a sealing bag using ribbons according to FIG. 14(a) and FIG. 14(c) showing part of FIG. 14(b) to a larger scale.

Referring to FIG. 1, this shows schematically an inflated, flexible bag 10 according to the invention, which is suitable for use in sealing an aerofoil to the fuselage of a variable-geometry aircraft. As shown the bag is of elongated form and its cross-section varies along its length.

The bag has no base-plate and its cross-sectional shape and dimensions are determined solely by the shape and dimensions of a multiplicity of internal, substantially parallel, closely-spaced, flexible transverse, flanged diaphragms of which a few are shown in dotted lines at 11. The diaphragms, and the corresponding cross-sectional shape of bag shown, are substantially triangular and hence have three major sides which are attached to corresponding sides of the bag 10.

Each diaphragm is made substantially inextensible (in a manner to be described later) in directions respectively perpendicular to the walls to which the edges of the diaphragm are attached. Each flange on each diaphragm is both bonded and stitched to its associated wall of the bag and is apertured to permit the flow of air or other inflating gas therethrough.

Referring to FIG. 2A, this shows three piece parts 11′, 11″ and 11‴ from which a diaphragm suitable for use in the bag of FIG. 1 can be fabricated. The broken lines such as 19′ indicate fold lines and the areas 19 outside the lines 19′ represent areas which are to form flanges in the finished diaphragm when the folds are made.

The parts shown in FIG. 2A are of neoprene reinforced with a woven web of nylon filaments. The reinforcing web is indicated by the hatching 12 and it is arranged that the warp of the web is arranged in each piece to be at right angles to the edge of the piece which is to form an outside edge in the finished diaphragm.

The piece parts of FIG. 2A are assembled in overlapping relationship as indicated in FIG. 2B. The areas of overlap are bonded to one another and, as a precaution against delamination, they are stitched to one another as indicated by dotted lines 12′.

The flanges are then formed by folding along the fold-lines 19′ to form the diaphragm ready for assembly in the bag. The diaphragm with the flanges folded into position is shown in FIG. 2C, the flanges not being visible in this Figure.

Apertures are then punched through the diaphragm as indicated at 18.

It will be seen that in FIG. 2C the profile of the diaphragm is not exactly a right angle. The upper corner (in FIG. 2C) is cut off and has no flange. This is for a purpose to be described later.

The diaphragm may need to be further modified in shape, as, for example, by cutting off the lower left-hand corner as indicated by the broken line 14. The diaphragm would then have three major sides 15, 16, 17 each provided with a fixing flange and a minor side 14 also provided with a flange.

It will be appreciated that although each piece part 11′, 11″ and 11‴ is extensible if pulled on the bias by virtue of the elasticity of the neoprene sheet, it is constrained by the warp of the nylon web to be relatively inextensible in a direction at right angles to the edge thereof destined to be an outside edge of the finished diaphragm.

Referring now to FIG. 3, this indicates the manner in which each diaphragm is attached to the walls of the bag. A fragment of the bag 10 is shown with two diaphragms 11. Each edge of each diaphragm each has a flange 19 which is bonded to the corresponding wall of the bag and is also stitched thereto as indicated by crosses at 20 along the fold lines.

FIG. 4 is a sequence of schematic drawings (or flow chart) indicating the manner in which the bag of FIG. 1 may be fabricated.

A set of diaphragms is prepared by the application of a heat-curable bonding agent to the outer surfaces of the flanges. The bonding agent is allowed to become touch-dry.

Figure 4A:
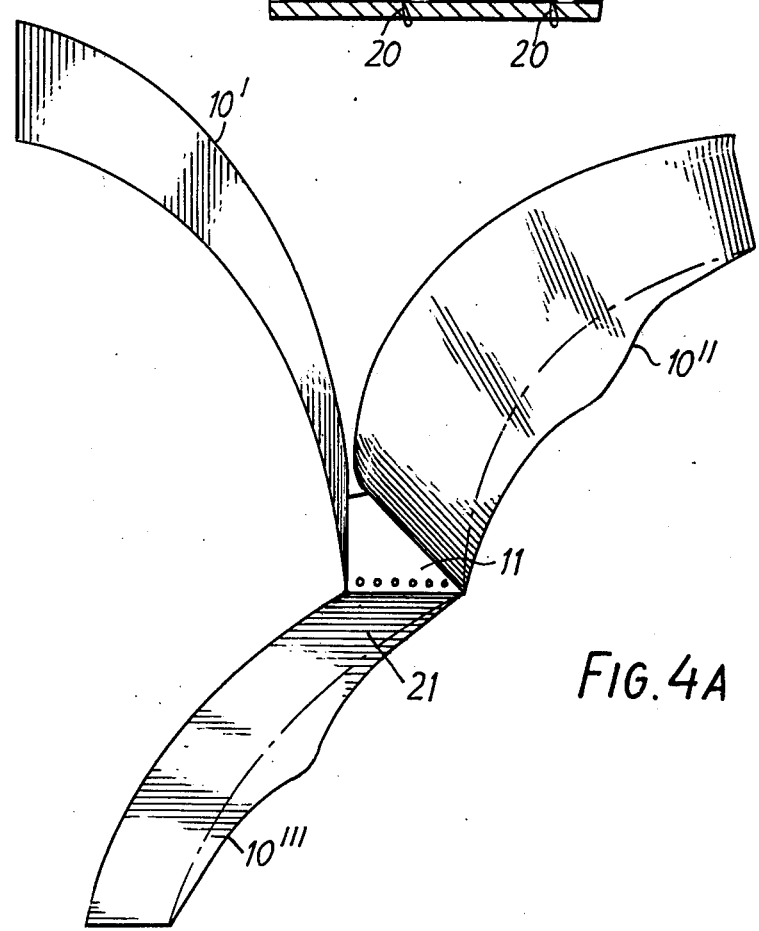

As shown in FIG. 4A, a set of three sides 10′, 10″ and 10‴ of a bag are marked by parallel lines 21 indicating the lines along which the diaphragms are to be attached to the walls.

The bonding agent on the flanges has enough tackiness to enable the flanges, when pressed into position with the fold lines along the lines 21, to be adequately held for stitching.

The diaphragm for one end of the bag has its flanges pressed into position and the stitching is effected to all three sides 10′, 10″ and 10‴. The next adjacent diaphragm next has its flanges pressed into position and stitched. This is continued until all diaphragms are located and stitched.

Instead of working from one end of the bag progressively to the other, the procedure can alternatively be to work from an intermediate location towards each end.

Figure 4B:
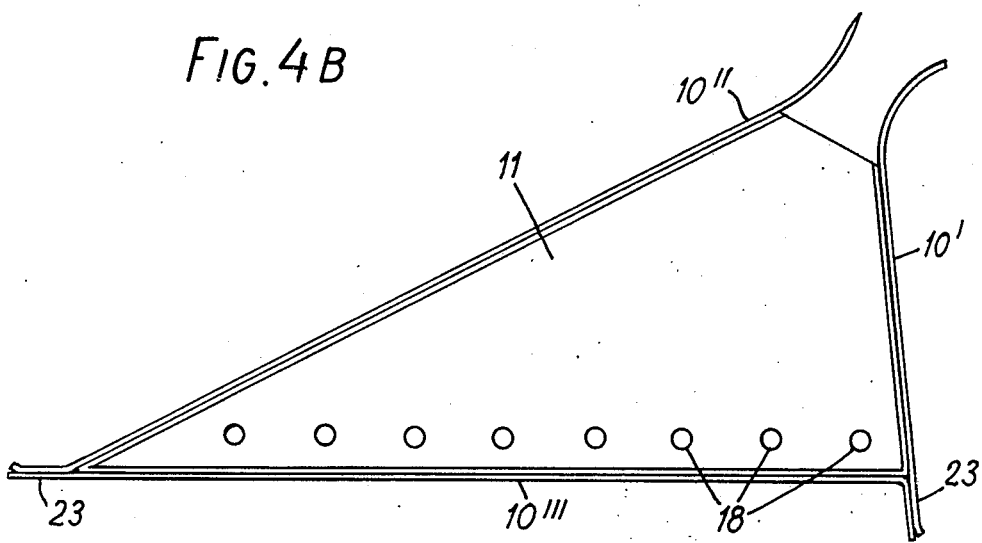

When the diaphragms are located and stitched in position the cross-sectional shape is as shown in FIG. 4B.

Figure 4C:
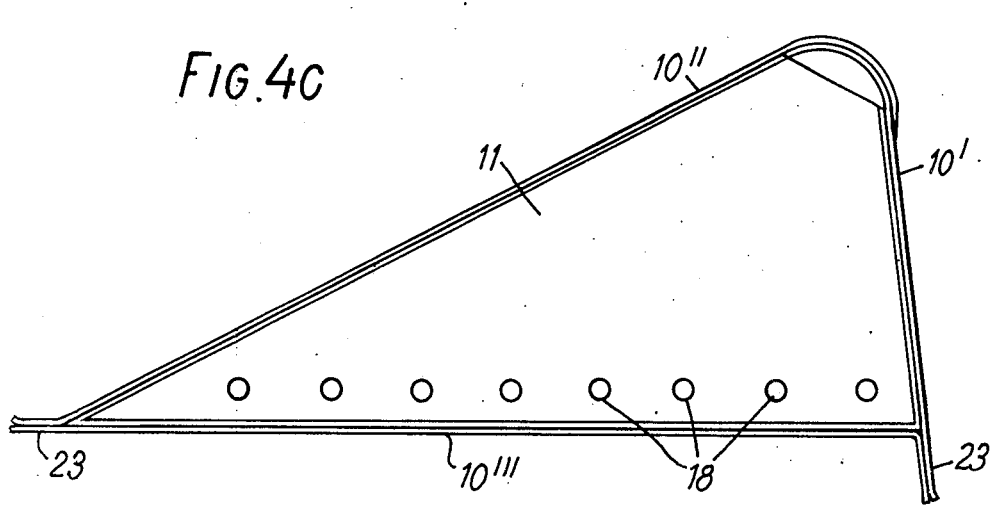
Figure 4D:
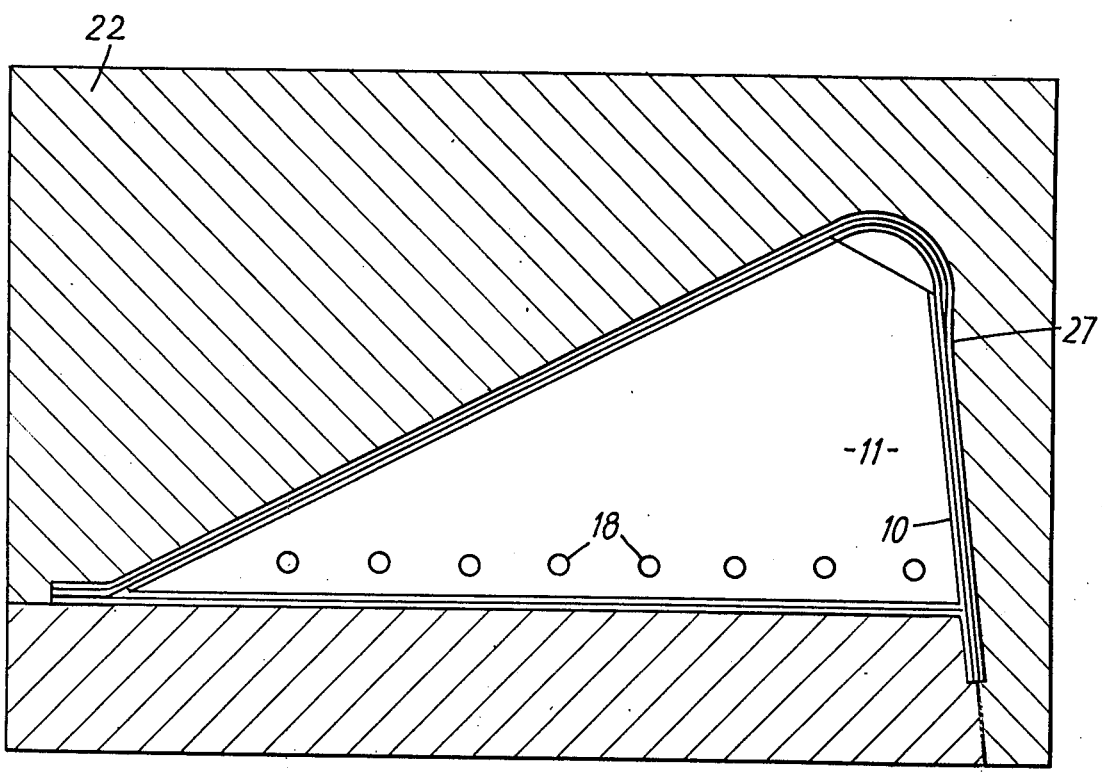

By using a suitable forming tool and a bonding agent the edges of the walls 10′ and 10″ projecting upwardly at the top of FIG. 4B are brought round in a curve and fixed in position as shown in FIG. 4C. This leaves gaps as shown between the top of each diaphragm and the curved top of the bag. The purpose of this in the finished bag is to allow a region along the apex clear of diaphragm, this being a region which is deformed by being urged against an aerofoil and against a co-operating sealing bag.

A sheath of woven PTFE and nylon filaments is then located over the walls 10′ and 10″ to be bonded thereto.

The curing of the bonding agent may then be effected by closing the ends of the bag; placing the bag in a heated mould of complementary shape; inflating the bag to urge the walls firmly against the walls of the mould; and curing the bonding agent under the applied heat and pressure.

This is as shown in FIG. 4C in which the mould is indicated at 22 and the outer sheath at 27.

In an alternative method to that of inflation and curing, gaps are left along one edge to permit V-shaped metal supports (not shown) to be inserted which consolidate the assembly for curing.

Referring now to FIG. 5, this shows in cross-section part of a variable-geometry aircraft according to the invention fitted with sealing bags according to the invention.

Part of the fuselage 25 of the aircraft is shown together with part of a "swing-wing" 25′ projecting partly into a recess 24 in the fuselage 25.

Two sealing bags 10 (as hereinbefore described) are mounted in the recess 24 and in sealing contact with the aerofoil 25′. The outer faces of the bags 10 constitute continuations of the fuselage surface across the gaps shown to the upper and lower surfaces of the aerofoil.

Each bag is secured to the aircraft by a frame 26 which clamps the flexible base-wall of the bag to a wall of the recess on which it is mounted by fixing bolts, Referring now to FIGS. 6 to 8, these show a modification in which T-section ribbon is used to form the flanges on the diaphragms. As in the first embodiment the cross-section of the bag is broadly triangular, there being a major base wall 32, a minor base wall 34 and two major free walls 36 and 38. The diaphragms 40 are attached to the walls of the bag and determine the shape and dimensions of the cross-section of the bag.

Each diaphragm is made from three main pieces 40', 40'' and 40''', as shown in FIGS. 6 and 7. The material is the same as earlier described and is joined by a bonding agent with reinforcing stitching 42, shown by dotted lines in FIG. 6.

To attach the diaphragms 40 to the wall of the bag a ribbon 44 is employed which is T-shaped in cross-section as seen in FIG. 7. The leg 44a of the T is attached by a bonding agent and stitching to the edge of the diaphragm and the two arms 44b and 44c of the T are attached to the associated wall of the bag to either side of the diaphragm 40.

The ribbon 44 is cut to the appropriate length for each edge of the diaphragm and may be shaped as shown in FIG. 8 to fit neatly within the bag.

The bag is covered with a sheath as described in the first embodiment and is riveted to a frame as indicated diagrammatically by rivets 46.

FIGS. 9 to 11 show another modification employing an alternative method of joining the diaphragm to the base wall. In this bag, which is otherwise similar to the bag of FIGS. 6 to 8, the edge of the diaphragm to be joined to the base wall of the bag is provided with loops 50 and the base wall itself is provided with loops 52 which inter-engage with the loops 50. The loops 50 are formed from a strip 54 shown in FIG. 10A which includes a line of apertures 56. When folded along the line of apertures 56 the bridging portions between the apertures become the loops 50. Other apertures are also provided to either side of the apertures 56 and these co-operate with holes along the edge of the diaphragm to provide air passages through the diaphragm.

FIG. 10B also shows the other main components 60', 60'' and 60''' of the diaphragm.

FIGS. 11A and 11B show the edge of the diaphragm joined to the base wall by a hinge pin 62 which passes through the loops 50 and 52 alternately. As shown in FIG. 11A, the pin 62 is continuous in the sense that it extends along the bag passing up and down the diaphragms in turn.

Referring now to FIGS. 12(a) and (b), 13, and 14(a) (b) and (c), these show a preferred method of fixing the diaphragms to the walls of the bag. In FIGS. 1 to 5 and 12 to 14 like parts have the same reference.

Referring to FIGS. 12(a) and (b), a sealing bag of which a fragment is shown is for use as described in the first embodiment for providing a seal between the fuselage of a variable-geometry aircraft and an aerofoil which can be swung fore and aft with its trailing edge accommodated more or less in a recess or gap in the fuselage depending upon the angle through which the aerofoil is swung.

The sealing bag shown comprises outer walls of which a part of one is shown at 10 and the cross-sectional shape and dimensions of the bag when inflated are determined by a multiplicity of internal, substantially parallel, closely-spaced, flexible transverse diaphragms of which two are shown at 11 in FIG. 12(a).

The invention lies in the means whereby the diaphragms 11 are attached to at least two of the walls 10, these being the walls which are subjected to distortion when the aerofoil is swung in contact with the bag. In the embodiment shown in FIGS. 12(a) and (b) the means for attaching the diaphragms 11 to the wall 10 comprise a ribbon 100. The ribbon is of T-shape and is of leno-weave with that region of the leg of the T which adjoins the crossbar devoid of or containing a substantially reduced number of warp threads. As shown, this region is devoid of warp threads and in practice extends about ⅜ inch down the leg of the T and is indicated by the legend "weft only". The other regions indicated by the legend "Square weave" are clad with neoprene rubber enabling the crossbar of the T to be bonded to the wall 10 and enabling the lower extremity of the leg of the T to be bonded to the diaphragm 11 in each case. In addition the crossbar of the T is machine-stitched to the wall 10 as indicated at 20 adjacent the junction with the leg of the T. Furthermore the leg of the T is machine-stitched to the diaphragm 11 as indicated at 101.

Thus the joint between each diaphragm and walls of the bag are through connections consisting solely of weft threads providing a greater degree of flexibility and immunity from the effects of distortion when operating at extremely low temperatures such as minus 40° or 50°.

Referring now to FIG. 13, this shows a further modification in which the ribbon 100 instead of being of T-shape is of L-shape. One limb of the L is clad with neoprene rubber and is bonded and stitched at 20 to the wall 10. The other limb is devoid of warp threads over about ⅜ inch proceeding away from the angle of the L. The remainder of this limb is of square weave as indicated and is clad with neoprene rubber and bonded and stitched (at 101) to the diaphragm 11. It will be appreciated that the ribbon is produced in flat form and assumes the L-shape only when affixed in position as shown in the drawing.

Referring now to FIGS. 14(a) (b) and (c), the ribbon 100 used in this embodiment is of generally U-shape and has three regions of square-weave separated by two regions of weft only as can be seen in FIG. 14(a). The regions of square-weave are clad with neoprene rubber and are respectively at the two extremities of the U and a central region of the U. The regions at the two extremities are bonded and stitched to adjacent diaphragms 11 and to the adjacent limbs of the next adjacent ribbons as indicated. The central region of square-weave is bonded to the wall of the bag and is stitched thereto as indicated at 20.

Thus in this embodiment each diaphragm is attached to walls of the bag solely through weft threads but in this case through weft threads of two ribbons angled to one another as shown when the bag is inflated and the diaphragms are tensioned.

It will be understood that in the arrangements of FIGS. 12 to 14 instead of using "weft only" regions these can be "warp only" regions. Furthermore, to simplify fabrication the "square-weave" sections of the ribbons attached to the diaphragm parts 11', 11'' and 11''' can alternatively be used as the reinforcement therein whereby separate ribbons and reinforcements can be avoided.

I claim:

1. A variable geometry aircraft provided with a seal between a surface of an aerofoil and the fuselage, the seal comprising an elongated, inflated, flexible bag bridging a gap between the aerofoil and the fuselage, the bag being mounted in a recess in the fuselage with one wall of the bag serving as a continuation of the fuselage-surface across the gap to the aerofoil, all the longitudinal walls of the bag being of flexible material and including a flexible-base-wall affixed along two longitudinal edges to the aircraft fuselage, the bag further having a multiplicity of internal, substantially parallel, closely-spaced, flexible, transverse diaphragms, each said diaphragm having flanges along its edges and being attached by said flanges to corresponding longitudinal walls of the bag, each said diaphragm being constructed of a plurality of major parts of elastomeric sheet material affixed to one another, each major part being individually reinforced by a reinforcing web so arranged as to render each said diaphragm substantially inextensible, and each said diaphragm being apertured to permit the passage of inflating gas therethrough.

2. An inflatable, flexible bag suitable for use in providing a seal between an aerofoil and the fuselage of a variable-geometry aircraft, the bag having an elongated form and having a base-wall and at least two other major walls and a cross-section which may vary along the length of the bag, the cross-sectional shape and dimensions of the bag, when inflated, being determined solely by the shape and dimensions of a multiplicity of internal, substantially parallel, closely-spaced, flexible, transverse diaphragms, each said diaphragm having flanges along its edges and being attached by said flanges to corresponding walls respectively of the bag, each said diaphragm having at least three major edges attached to the major walls of the bag, each said diaphragm being constructed of a plurality of major parts of elastomeric sheet material affixed to one another, each major part being individually reinforced by a reinforcing web so arranged as to render the diaphragm substantially inextensible, and each diaphragm being apertured to permit the passage of inflating gas therethrough.

3. A bag according to claim 2, wherein said flanges are integral with the diaphragms and are bonded and stitched to said walls.

4. A bag according to claim 2, wherein said flanges are formed from ribbons attached to the diaphragms and the walls of the bag by bonding and stitching.

5. A bag according to claim 4, wherein each ribbon is of L-shape with one limb of the L attached to one of said diaphragms and the other limb attached to one of said walls of the bag.

6. A bag according to claim 4, wherein each ribbon is of T-shape with the leg of the T attached to one of said diaphragms and the crossbar of the T attached to one of said walls of the bag.

7. A bag according to claim 4, wherein each ribbon is of U-shape with the limbs of the U attached to adjacent ones of said diaphragms and the base of the U attached to one of said walls of the bag.

8. A bag according to claim 4, wherein a region of each ribbon which extends between one of said diaphragms and one of said walls of the bag, consists of warp threads only and the remainder of the ribbon which is attached to said one of said diaphragms and said one of said walls of the bag is of square warp and weft weave.

9. A bag according to claim 2 wherein the base-wall flanges on each diaphragm are connected to the diaphragm through a hinge.

10. A bag according to claim 4 wherein a region of each ribbon which extends between one of said diaphragms and one of said walls of the bag consists of weft threads only and the remainder of the ribbon which is attached to said one of said diaphragms and said one of said walls of the bag is of square warp and weft weave.

* * * * *